C. M. GRAVATT.
STATION INDICATOR.
APPLICATION FILED MAR. 24, 1920.
1,395,816.
Patented Nov. 1, 1921.
4 SHEETS—SHEET 2.
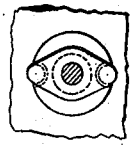
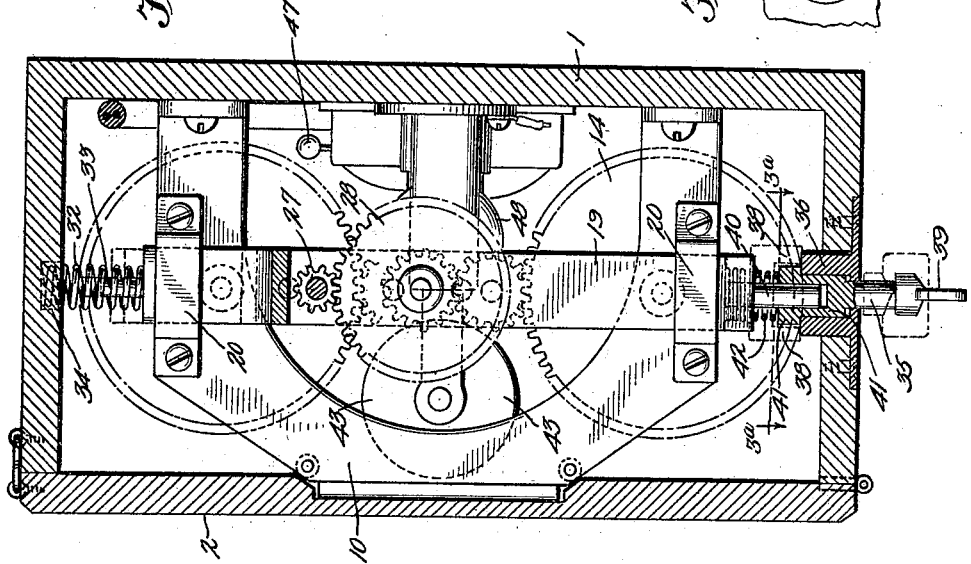
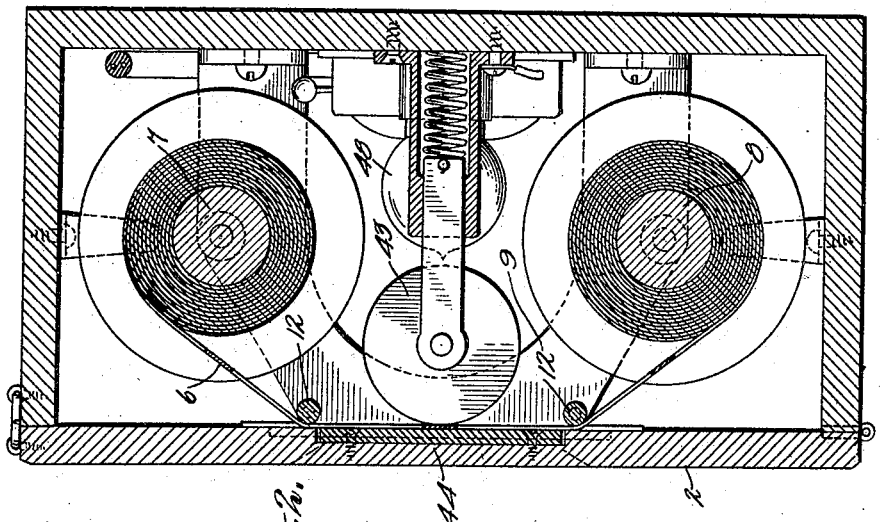
WITNESSES
INVENTOR
C. M. GRAVATT,
BY
ATTORNEYS C. M. GRAVATT.
STATION INDICATOR.
APPLICATION FILED MAR. 24, 1920.
1,395,816.
Patented Nov. 1, 1921.
4 SHEETS—SHEET 3.
Fig. 10.
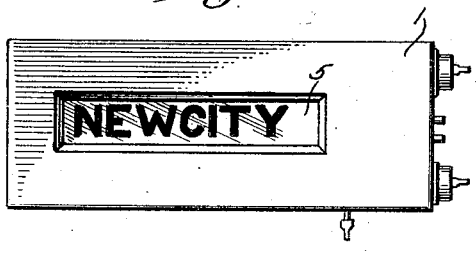
Fig. 11.
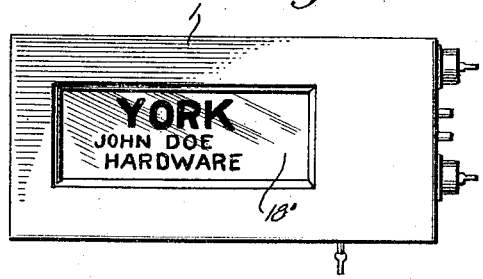
Fig. 4.
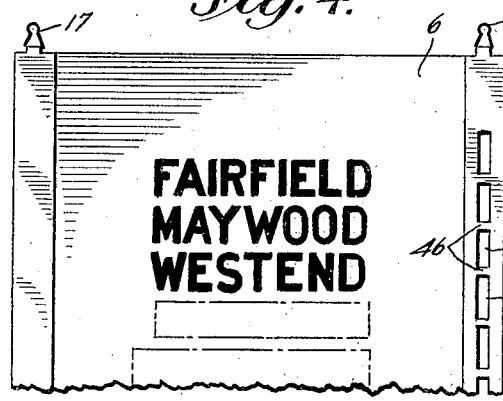
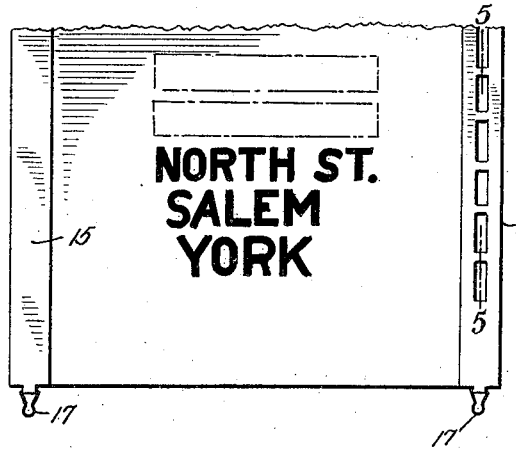
Fig. 5.
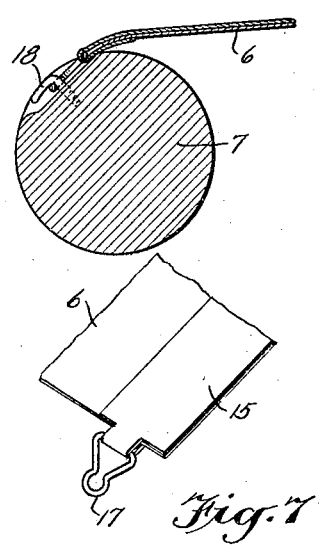
Fig. 6.
Fig. 7.
WITNESSES
Geo. W. Naylor
A. W. Foster
INVENTOR
C. M. GRAVATT,
BY
ATTORNEYS C. M. GRAVATT.
STATION INDICATOR.
APPLICATION FILED MAR. 24, 1920.
1,395,816.
Patented Nov. 1, 1921.
4 SHEETS—SHEET 4.
Fig. 8.
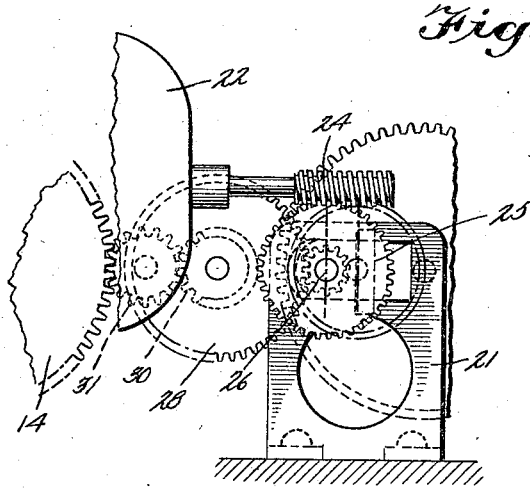
Fig. 9.
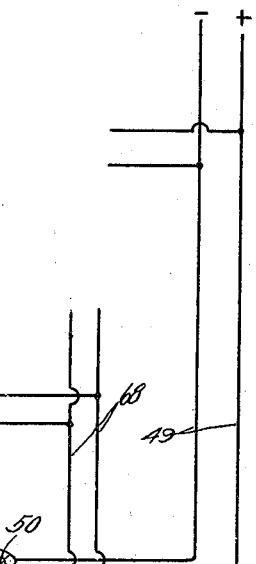
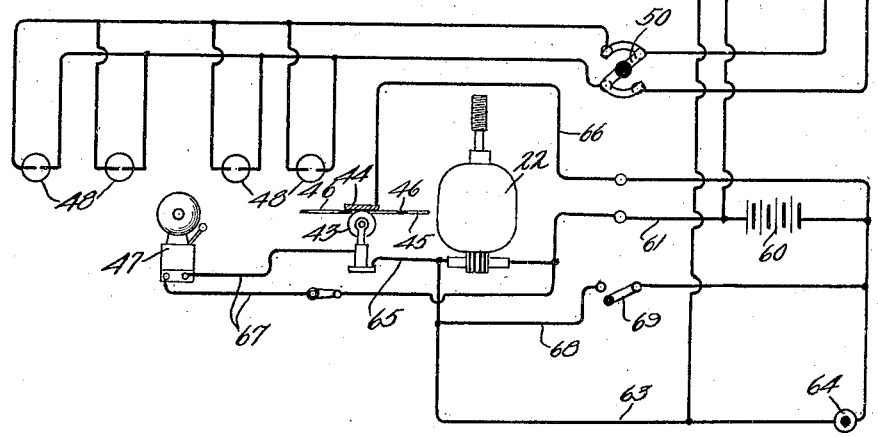
WITNESSES
Geo. W. Naylor
A. W. Foster
INVENTOR
C. M. GRAVATT,
BY Munn & Co
ATTORNEYS

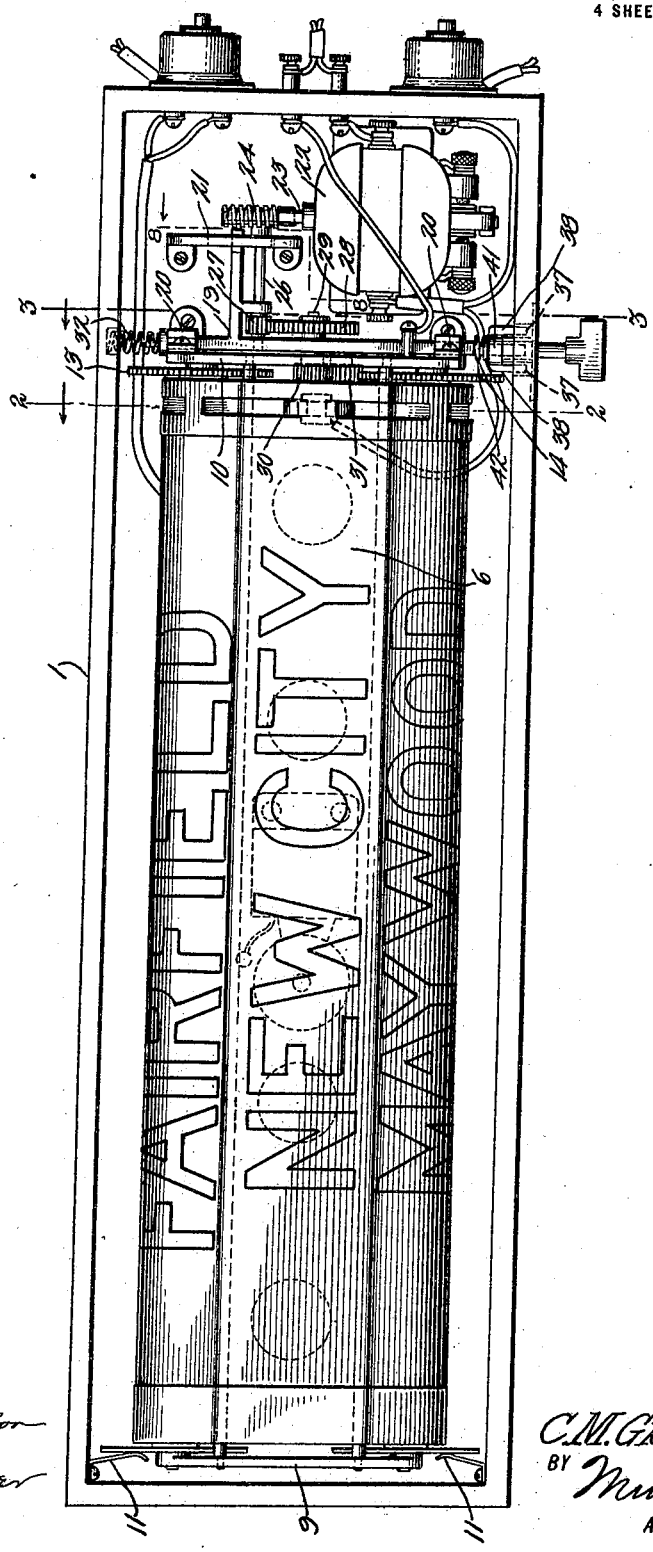

UNITED STATES PATENT OFFICE.

CHARLES M. GRAVATT, OF PORT ROYAL, VIRGINIA.

STATION-INDICATOR.

1,395,816. Specification of Letters Patent. Patented Nov. 1, 1921.

Application filed March 24, 1920. Serial No. 368,471.

*To all whom it may concern:*

Be it known that I, CHARLES M. GRAVATT, a citizen of the United States, and a resident of Port Royal, in the county of Caroline and State of Virginia, have invented a new and Improved Station-Indicator, of which the following is a full, clear, and exact description.

This invention relates to improvements in station indicators, an object of the invention being to provide an electrically operated and controlled indicator adapted to be positioned in the end or ends of a car and which will indicate to the passengers the stations as they are approaching the same, thus relieving the conductor or brakeman of the necessity of calling out the stations and prevent confusion from misunderstanding such calls.

A further object is to provide a station indicator which will be relatively small and compact, which will be extremely simple in construction and in operation, which will insure a uniform movement of the curtain or web containing the names of the stations at each operation, and which will most efficiently perform the functions for which it is intended.

A further object is to provide improved electrically controlled means which may operate any number of my improved station indicators simultaneously so that all of the indicators in the cars of the train can be simultaneously operated by the conductor to display in all of the cars the stations as they are approached by the train.

With these and other objects in view the invention consists in certain novel features of construction, and combinations and arrangements of parts as will be more fully hereinafter described and pointed out in the claims.

In the accompanying drawings—

Figure 1 is a view in front elevation of my improved station indicator with the cover plate removed;

Fig. 2 is an enlarged view in vertical section on the line 2—2 of Fig. 1 with the cover plate in position;

Fig. 3 is a view similar to Fig. 2 taken on the line 3—3 of Fig. 1;

Fig. 3ª is a detail sectional view on the line 3ª—3ª of Fig. 3;

Fig. 4 is a broken view in elevation of my improved curtain or web;

Fig. 5 is an enlarged view in section on the line 5—5 of Fig. 4;

Fig. 6 is a fragmentary view in section illustrating the manner of connecting the curtain or web to one of the reels;

Fig. 7 is a detail perspective view of one corner of the curtain or web;

Fig. 8 is an enlarged fragmentary sectional view taken on the staggered line 8—8 of Fig. 1;

Fig. 9 is a diagrammatic view illustrating my invention and electric circuits in connection therewith;

Fig. 10 is a view in front elevation of my improved station indicator; and

Fig. 11 is a view similar to Fig. 10 illustrating a modification.

1 represents the oblong box or casing of my improved station indicator having a front plate 2 which may be connected to the casing 1 at its lower edge by means of hinges 3 and provided at its upper edge with suitable fastening devices 4 to hold the front plate in position. This front plate 2 is made with an opening or transparent portion 5 to expose the curtain or web 6 and display the name of a station at the opening or transparent portion 5.

The curtain 6 is wound at its ends on suitable reels 7 and 8, the latter supported by brackets 9 and 10 and provided with spring friction tongues 11 to prevent accidental movement of the reels. The brackets 9 and 10 also support relatively small rolls 12 which hold the intermediate portion of the curtain taut across the opening or transparent portion 5, and gear wheels 13 and 14 are secured on the ends of the reels 7 and 8 respectively, as shown clearly in Fig. 1. The curtain 6 is provided at its edges with strengthening or reinforcing tapes 15 and 16 respectively and the latter at their ends are provided with metal loops 17 positioned over hooks 18 on the reels to removably secure the curtain thereto.

On the curtain 6 the names of stations are printed and if desired, advertising matter may be also placed on the curtain in connection with the name of the station, as indicated in the modification in Fig. 11, in which case, of course, the opening or transparent portion 18' will be correspondingly large to permit of a greater display of curtain.

An adjustable gear supporting frame 19 is mounted to slide in suitable bearings 20 on the bracket 10 and is also supported and guided by means of a bracket 21 suitably slotted for the accommodation of the frame and parts carried thereby, and it will be noted that the bracket 10 is arched so as to provide ample space for the gearing carried by the frame 19.

An electric motor 22 is mounted in one end of the casing 1 and is provided on its drive shaft 23 with a worm 24 meshing with a worm wheel 25 on a shaft 26, the latter supported by the gear frame 19. A pinion 27 on shaft 26 transmits motion to a gear wheel 28 which is mounted on a short shaft 29 carried by the frame 19 and a pinion 30 is secured on the shaft 29 and meshes with a pinion 31 mounted on the frame 19 and in vertical alinement with the pinion 30. These pinions 30 and 31 are located between the gear wheels 13 and 14. A coiled spring 32 is interposed between the top of the casing and the upper end of the gear frame 19 and is held in operative position by means of a pin 33 on the frame 19 and also by means of a socket 34 in the top of the casing 1 where the upper end of said spring is housed. This spring exerts a pressure downwardly upon the frame 19 tending to hold the pinion 31 in mesh with the gear wheel 14 so that when the motor 22 operates, it imparts motion to the gear wheel 14 and reel 8 to wind the curtain on the said reel 8.

A stud 40 is provided on the lower end of the gear frame 19 and provides rotary mounting for a recessed head 41 on the upper end of a rod 35 and this rod 35 projects through a sleeve 36 secured in the bottom of casing 1. This sleeve 36 is made with recesses 37 adapted to accommodate webs 38 on the sides of the head 41 and permit the frame to be moved downwardly by the spring 32 sufficiently far to bring the pinion 31 in mesh with the gear wheel 14. A finger hold 39 which is preferably wing shaped is provided on the lower end of the rod 35 and this finger hold 39 can be grasped to force the frame 19 upwardly and when in such position, the rod 35 is given a partial turning movement to position the webs 38 on the upper end of the sleeve 36 as shown in dotted lines in Fig. 3 to position the pinion 30 in mesh with the gear 13 and thus reverse the direction of movement of the curtain. To insure a proper engagement of the pinion 30 with the gear wheel 13 and to prevent an undue binding action of the gears, I preferably provide a coiled spring 42 around the stud 40 and bearing at its respective ends against the head 41 and the lower end of the frame 19 so as to exert a cushioning action on the frame and maintain the pinion 30 and gear 13 in mesh and compensate for any slight variation or discrepancy in the movement of the frame. It is, of course, to be understood that this spring 42 is appreciably weaker than the spring 32 so as not to interfere with the operation of the latter and by providing the two springs 42 and 32 a cushioning engagement of the gears is had in both positions of adjustment.

The casing 1 supports between the reels 7 and 8 a spring pressed roller contact 43 which engages a fixed contact plate 44 carried by the front plate 2 of casing 1. The tape or strip 16 of the curtain 6 is interposed between the roller contact 43 and the contact plate 44 and is provided with longitudinal slots 45 of a width sufficient to accommodate the roller contact 43 and permit said contact to engage the fixed contact 44.

Between the slots 45 integral bridge pieces 46 are formed which operate to separate the contacts 43 and 44 and thus open the electric circuit. These portions 46 which constitute the ends of the slots 45 and which are termed bridge pieces, are located centrally relative to the names of the stations on the curtain so that the circuit is broken when the name of the station is exactly centered relative to the opening or transparent portion 5 of the casing and this breaking or opening of the circuit is automatically brought about by the movement of the curtain to position one of the bridges 46 between the contacts 43 and 44. A bell or alarm 47 is provided in the casing and is in electric circuit with the motor so that at each operation of the motor, the bell is sounded to attract attention to the station indicator.

In the casing 1, I provide any desired number of electric lamps 48 located back of the curtain 6 and this curtain 6 may be of opaque material having transparent letters thereon or may be made of transparent material with opaque letters thereon so that when the lamps 48 are illuminated, the names of the stations can be conveniently read at night or in the dark.

In Fig. 9 I illustrate an electric diagram showing an arrangement of electric circuits which may be utilized in connection with my improved station indicator. The electric lamps 48 are included in the line circuit wires 49 of the car or train and provided with a suitable switch 50 to control them. 60 represents a battery or source of electricity which is connected at one side by a wire 61 with the motor 22 and from the motor a wire 63 extends back to the other side of the battery 60 and is provided with a push button or other circuit closing device 64 to control the circuit to the motor.

It is to be understood that I use the term push button to indicate a device which will momentarily close the circuit and then open the circuit and I may employ any device for the purpose. The operation of the push button 64 closes the circuit through the motor 22 to move the curtain 6 a distance of one station as above explained, the circuit being maintained closed after the motor is started through a shunt circuit including a wire 65, roller contact 43, stationary contact 44, and wire 66 to the battery 60. When a bridge piece 46 moves between the roller contact 43 and the stationary contact 44, the circuit will be broken so that the tape will stop and remain in this position until the push button 64 is again operated. The bell 47 is included in a shunt circuit 67 so that at each closing of the circuit by means of the push button 64, the bell will be sounded.

Line wires 68 are included in the circuit above described so that any number of similar circuits may be employed in accordance with the number of station indicators desired so that all of the station indicators will be operated simultaneously when the push button 64 is operated by the conductor. A wire 68' is provided which short circuits the battery 60 and the motor 22 and is provided with a switch 69 so that this switch can be operated at any time desired to maintain a continuous operation of the motor to position the curtain as desired, and it frequently happens that it is necessary to move the curtain so as to bring the proper station into position on the indicator, and by reason of this switch 69 the tape can be moved any distance desired. It is, of course, to be understood that this switch 69 is normally open and the operation of moving the curtain is controlled by the push button 64 which causes the initial operation of the motor 22.

When the train or car reaches the end of the route, the direction of movement of the curtain is reversed by means of the rod 35 and finger hold 39 to cause the longitudinal movement of the gear frame 19 to shift the gears, as above explained.

Various slight changes might be made in the general form and arrangement of parts described without departing from the invention, and hence I do not limit myself to the precise details set forth, but consider myself at liberty to make such changes and alteration as fairly fall within the spirit and scope of the appended claims.

I claim:

1. A station indicator, comprising a casing, a pair of reels in the casing, a curtain wound at its ends on the reels and movable from one reel to the other, gear wheels on the reels, a sliding gear frame in the casing, pinions carried by the gear frame and movable into mesh with the respective gear wheels of the reels, a stud on the gear frame, a rotary head on the stud having webs thereon, a rod on the head projecting through the casing, a finger hold on the rod, and a fixed sleeve in the casing having recesses to receive the webs or support said webs against the end of the sleeve, whereby said gear frame is held in a position to maintain the respective pinions in engagement with the reel gears.

2. A station indicator, comprising a casing, a pair of reels in the casing, a curtain wound at its ends on the reels and movable from one reel to the other, gear wheels on the reels, a slidable and cushioned gear frame in the casing, pinions on the gear frame, means for sliding the frame to bring the pinions thereon into engagement with the respective gears of the reels, an electric motor, and a gear train on said frame operatively connecting the motor with said pinions.

3. A station indicator, comprising a casing, a pair of reels in the casing, a curtain wound at its ends on the reels and movable from one reel to the other, gear wheels on the reels, a sliding gear frame in the casing, pinions carried by the gear frame and movable into mesh with the respective gear wheels of the reels, a stud on the gear frame, a rotary head on the stud having webs thereon, a rod on the head projecting through the casing, a finger hold on the rod, a fixed sleeve in the casing having recesses to receive the webs or support said webs against the end of the sleeve, whereby said gear frame is held in a position to maintain the respective pinions in engagement with the reel gears, and a coiled spring engaging the gear frame and tending to hold one of the pinions in mesh with the gear wheel of the lower reel.

4. A station indicator, comprising a casing, a pair of reels in the casing, a curtain wound at its ends on the reels and movable from one reel to the other, a driven shaft, an adjustable and cushioned gear frame, gearing carried by the said frame and with which the driven shaft is geared, and means for adjusting the frame to bring the gearing into engagement with the respective gears of the reels.

5. A station indicator, comprising a casing, a pair of reels in the casing, a curtain wound at its ends on the reels and movable from one reel to the other, an electric motor in the casing, an adjustable gear frame, a worm on the drive shaft of the motor, a worm wheel carried by the gear frame and meshing with the worm, a gear train carried by the gear frame and operatively connecting the worm wheel with one of the reels, and means for adjusting the gear frame to operatively connect either of said reels with the motor.

CHARLES M. GRAVATT.